March 1, 1960
V. H. LAUGHTER
2,926,815
CONVEYOR RELEASE MECHANISM
Filed Oct. 11, 1955
3 Sheets-Sheet 2
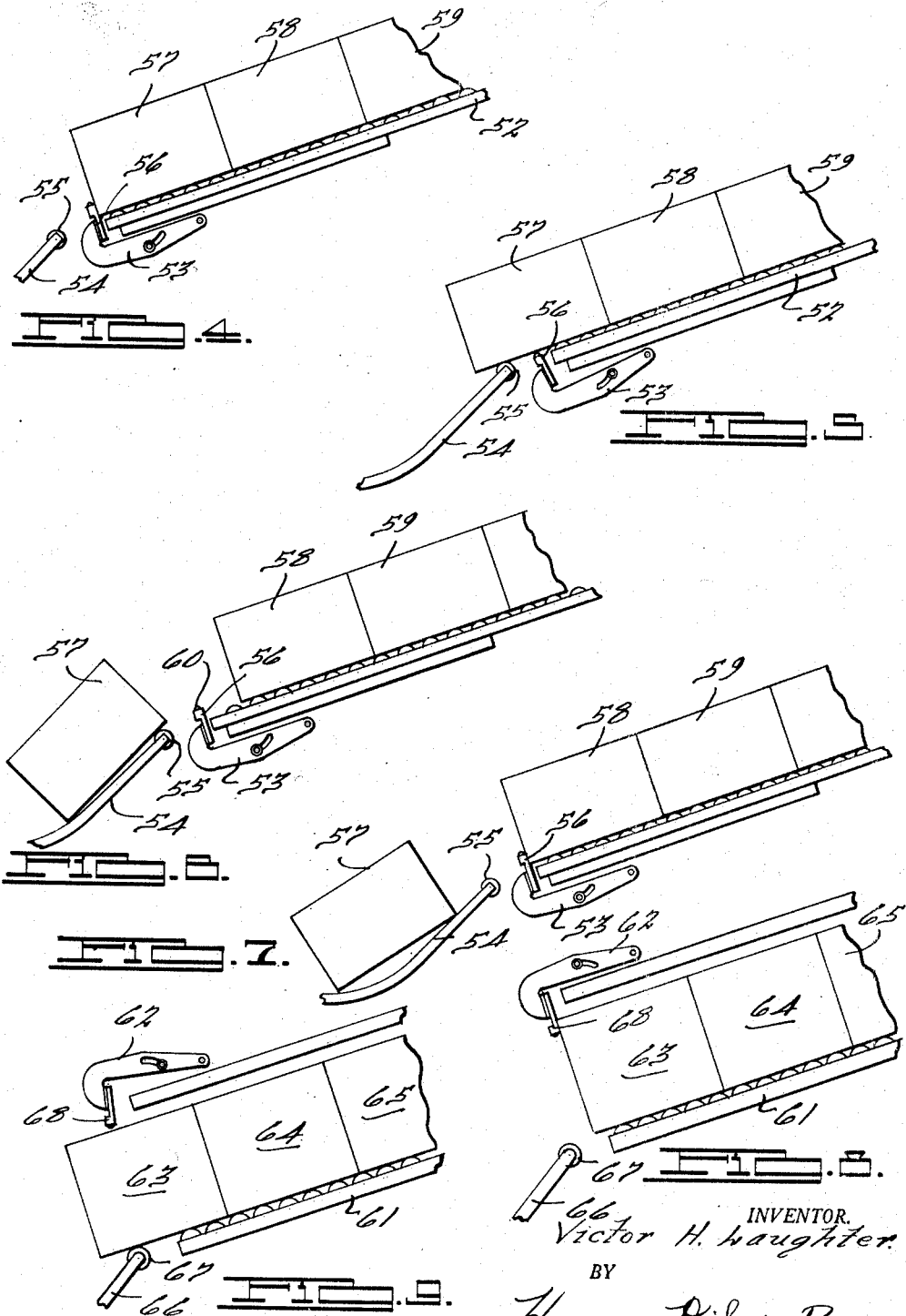
INVENTOR.
Victor H. Laughter
BY
Harness, Dickey & Pierce
ATTORNEYS

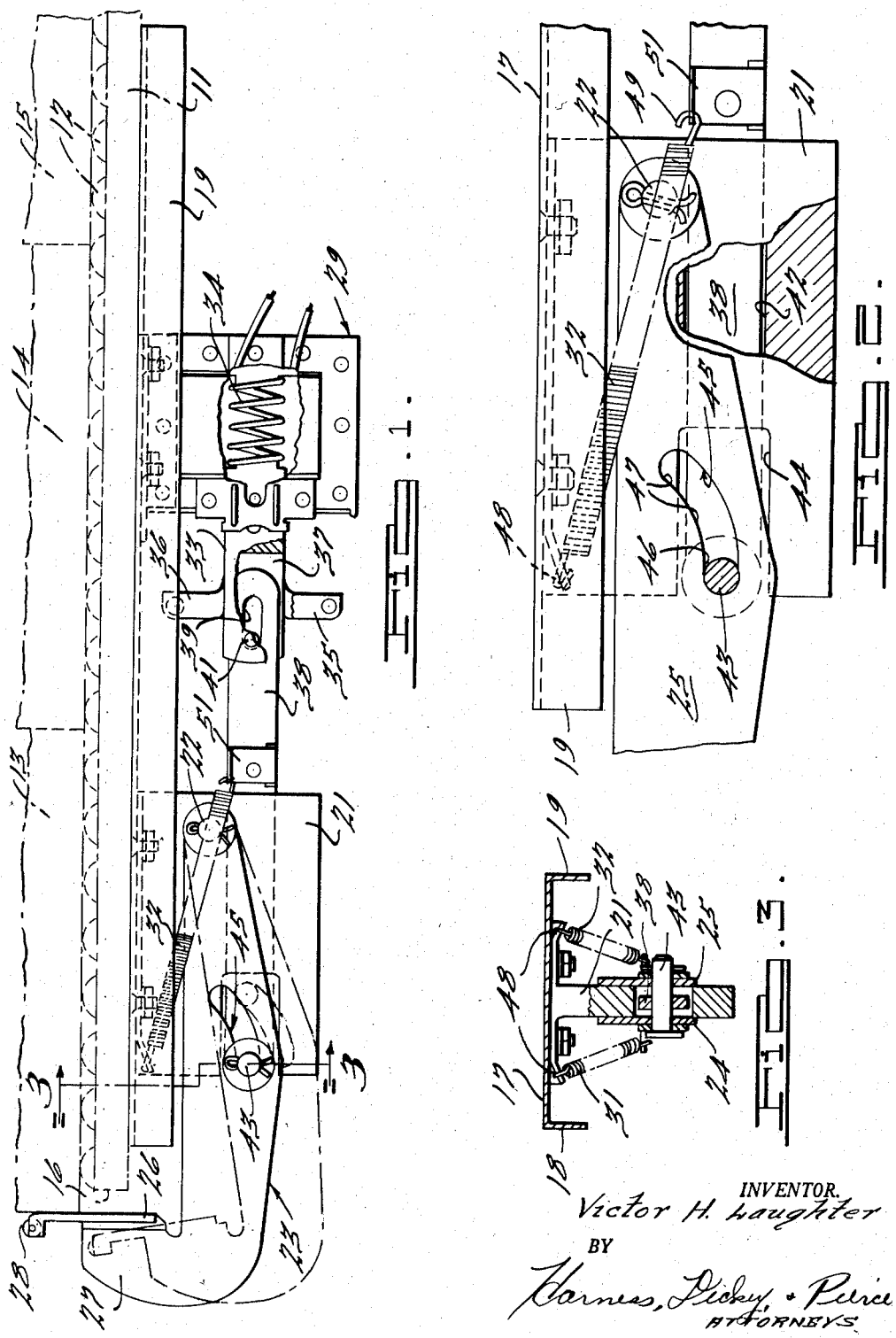

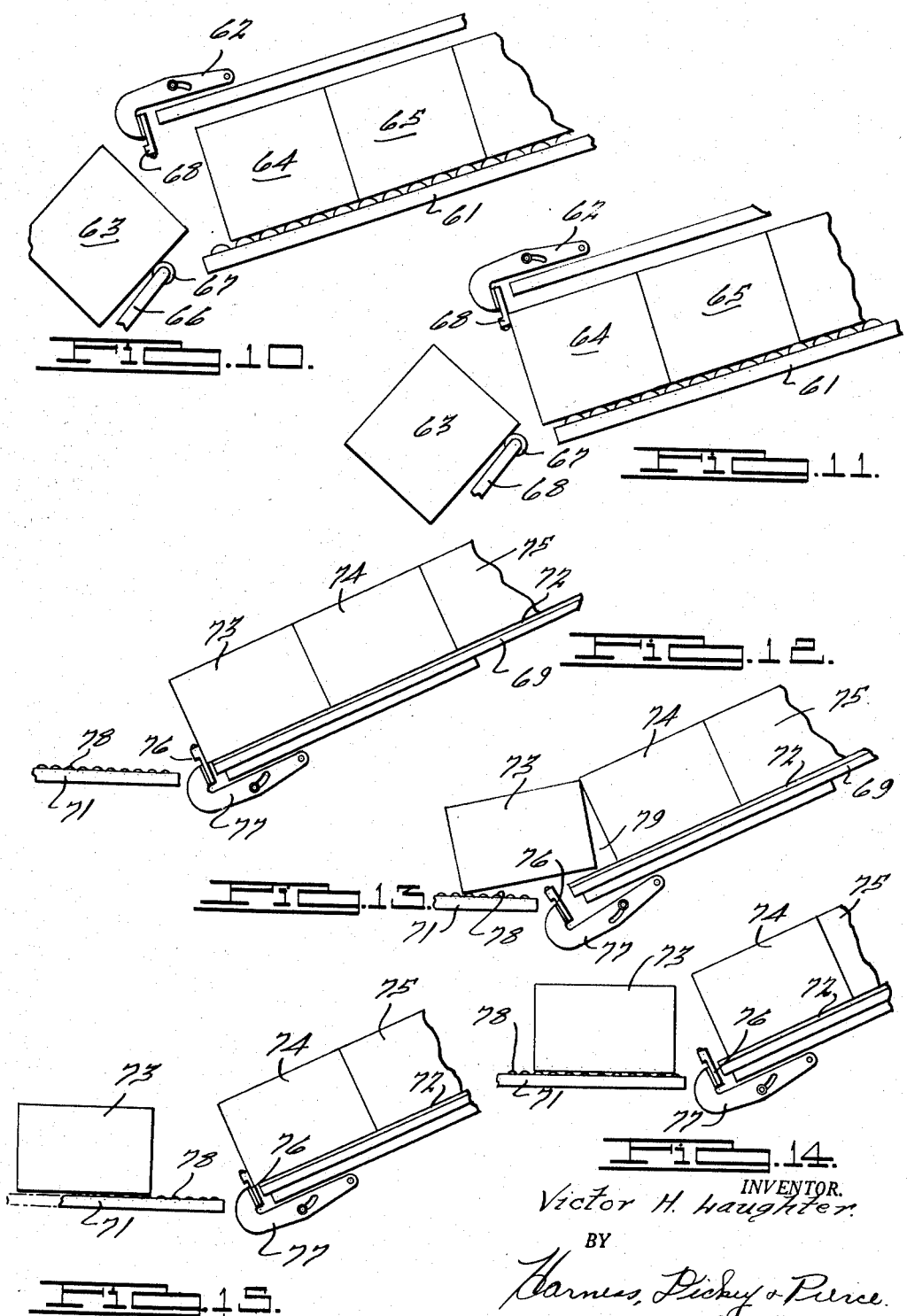

United States Patent Office 2,926,815
Patented Mar. 1, 1960

2,926,815

CONVEYOR RELEASE MECHANISM

Victor H. Laughter, Memphis, Tenn., assignor of one-half to Hanley W. Wolf, Detroit, Mich.

Application October 11, 1955, Serial No. 539,872

1 Claim. (Cl. 221—289)

This invention relates to conveyor release mechanisms, and more particularly to devices for controlling the discharge of individual objects such as merchandise containers from a conveyor along which the containers are propelled by their own weight.

In the handling of objects such as merchandise containers in large quantities, it is customary to provide inclined conveyors of the slide or skate roll type along which the containers are moved for storage or shipping purposes. The containers normally have flat ends which are flush against each other on the conveyor, the line of containers being propelled along the conveyor by its own weight. When it is desired to discharge a predetermined number of containers from the conveyor, the problem is presented of effectively stopping the movement of the remaining containers after the desired number have been released. Although various methods have been proposed in the past for effecting individual release of containers, these methods have been relatively slow or inefficient and have not been able to provide a foolproof way of preventing unintended container discharge for the wide variety of containers used in many merchandising fields.

It is an object of the present invention to provide a novel and improved conveyor release mechanism which is extremely reliable in operation and will serve positively to stop a moving line of containers after a predetermined number have been released.

It is another object to provide an improved conveyor release mechanism of this nature, which cannot be forced into released position by the weight of the line of containers, but in which the movement to fully released position will be aided by this weight after the release movement has been initiated.

It is also an object to provide an improved release mechanism of this character which is especially adapted for use with chutes carrying soft packages which might have a tendency to retard opening movement of the releasing gate, and which will greatly increase the effectiveness of solenoid energization for insuring that the gate will be opened.

It is a further object to provide an improved release mechanism having the above characteristics, which is equally reliable whether used to control the discharge of heavy objects or the discharge of relatively light objects, and in which the accuracy of control is maintained even though but a few objects remain on the conveyor and the propulsive force of the line has been diminished.

It is also an object to provide a conveyor release mechanism of the above nature which can be utilized in different positions with respect to the container line and in conjunction with various types of conveyor arrangements.

Other objects, features and advantages of the present invention will become apparent from the subsequent description, taken in conjunction with the accompanying drawings.

In the drawings:

Figure 1 is a side elevational view of the improved release mechanism of this invention, parts being broken away for clarity, showing the cooperation of the mechanism with a roller type of conveyor;

Figure 2 is a fragmentary enlarged side elevational view of one portion of the conveyor release mechanism, showing the configuration of the curved actuating slot, parts being broken away for clarity;

Figure 3 is a cross-sectional view taken along the line 3—3 of Figure 1, showing the disposition of the pin in the curved slots;

Figure 4 is a schematic side elevational view of one form of conveyor showing the improved release mechanism in conjunction therewith, the mechanism being in retaining position;

Figure 5 is a view similar to Figure 4 showing the first container partially released;

Figure 6 is a view similar to Figures 4 and 5 showing the first container fully released but with the second container still at some distance from the release mechanism;

Figure 7 is a view similar to Figures 4, 5 and 6 showing the second container engaging the release mechanism;

Figure 8 is a schematic view of another arrangement of the release mechanism, showing the mechanism above the line of containers, the mechanism being in retaining position;

Figure 9 is a view similar to Figure 8 but with the first container partially released;

Figure 10 is a view similar to Figures 8 and 9 but with the first container fully released and the second container approaching the stop;

Figure 11 is a view similar to Figures 8, 9 and 10 showing the second container engaging the stop;

Figure 12 is a schematic view of still another arrangement of the release mechanism, showing the mechanism used in conjunction with a conveyor which creates a space between containers as each container is discharged, the mechanism being shown in retaining position;

Figure 13 is a view similar to Figure 12 showing the first container partially released;

Figure 14 is a view similar to Figures 12 and 13 showing the first container fully released and the second container approaching the stop; and Figure 15 is a view similar to Figures 12, 13 and 14 showing the second container engaging the stop.

The improved release mechanism of this invention is adapted for use with various types of conveyors on which a line of objects such as containers is moved, the line being propelled by the weight of the objects. A conveyor of this type is indicated at 11 in dot-dash lines in Figure 1, this conveyor being of a skate roll type although the invention is adapted for use with other types of conveyors. The conveyor has a plurality of rollers 12 on which ride containers 13, 14 and 15 as three of a series. Although conveyor 11 is shown as in horizontal position in Figure 1 for purposes of the drawing, it will be understood that the conveyor will normally be inclined so that the weight of the containers has a propulsive effect. The conveyor release mechanism of this invention could however be used with other conveyors in which the propulsive force on the containers is obtained from some outside source. For example, the conveyor with which the release mechanism operates could be horizontal, with the containers thereon being propelled by the weight of containers on an inclined conveyor behind the horizontal conveyor. In any event, the release mechanism is positioned adjacent the discharge end of the conveyor section with which it is associated, this end being indicated at 16 in Figure 1.

The release mechanism is secured to a mounting plate 17 having a wide base section and a pair of side flanges 18 and 19, the cross-sectional configuration of the mounting plate being of inverted U-shape as shown in Figure 3. The mechanism parts are suspended below the mounting plate, the latter being securable in any appropriate manner to the underside of conveyor 11 when the release mechanism is to be engageable with the bottom edges of the containers. As will be seen later, the release mechanism may also cooperate with the upper edges of the containers, in which case separate supporting means for mounting plate 17 are provided.

The release mechanism comprises a T-shaped bracket 21 secured to the underside of mounting plate 17 and depending therefrom. Pivoted at 22 to the main section of bracket 21 is a stop assembly generally indicated at 23. This assembly comprises a pair of rocker arms 24 and 25 alongside bracket 21 and pivoted at 22 to the rearward end of this bracket. Stop assembly 23 further comprises a stop plate 26 secured by welding or other means to upwardly extending portions 27 at the outer end of rocker arms 24 and 25. The length of stop plate 26 is such that it extends across a substantial portion of conveyor 11, so that when in its retaining position shown in solid lines in Figure 1 it will be in obstructing relation with the lower portion of the adjacent container. Along the upper edge of stop plate 26 are mounted one or more rollers 28. These rollers project above the upper edge of the stop plate but are recessed from the operative stopping surface thereof, so that an advancing container will engage stop plate 26 without engaging rollers 28 when the stop plate is in retaining position.

Means are provided for rocking assembly 23 between a retaining position shown in solid lines in Figure 1 and a releasing position shown in dot-dash lines in this figure. This means comprises a solenoid generally indicated at 29 which serves to move the stop assembly from its retaining to its releasing position, and a pair of springs 31 and 32 which act to return the stop assembly to its retaining position. It will be understood that solenoid 29 is secured to the underside of mounting plate 17, being spaced rearwardly from bracket 21. The solenoid is provided with an armature 33 slidable between an extended position shown in Figure 1 and a retracted position. A spring 34 within the solenoid normally urges armature 33 toward its extended position. Energization of solenoid 29 will attract poles 35 and 36 attached to armature 33, causing rightward sliding movement of the armature against the action of spring 34. This movement will of course be of sudden occurrence upon energization of the solenoid, and when the solenoid is de-energized spring 34 will quickly return armature 33 to its extended position. It will be understood that the invention contemplates the use of other actuating means in place of solenoid 29 to furnish the same type of movement.

The outer end of armature 33 is slotted as shown at 37 in Figure 1, and disposed within this slot is one end of a connecting link 38. The link is provided with an elongated slot 39 within which is disposed a pin 41 secured to the outer end of armature 33. Slot 39 and pin 41 thus constitute a lost motion connection between armature 33 and link 38.

Link 38 extends through a guide slot 42 in bracket 21, and the forward end of this link carries a pin 43. This pin, which extends from both sides of link 38, is disposed within a clearance opening 44 in the forward end of bracket 21, and extends through a pair of identically curved cam slots generally indicated at 45 in rocker arms 24 and 25. The slots, which are best seen in Figure 2, are of generally arcuate shape, being concave upwardly, and are of sufficient width to accommodate pin 43 with relatively little play between the slots and pin. The forward end of each slot 45 is substantially parallel to conveyor 11 when rocker arms 24 and 25 are in their retaining position, and the slots curve upwardly and rearwardly, the intermediate and rear portions of the slots having a substantial inclination with respect to the conveyor.

Because of this configuration, the forward portion of the upper surface of each cam slot, indicated at 46 in Figure 2, will form a locking surface with respect to pin 43 when rocker arms 24 and 25 are urged clockwise due to the weight of containers thereon. This locking action will result from the fact that the points of engagement of surfaces 46 with pin 43 will create downward force components on the pin rather than rearward force components which might occur if the cam surfaces were inclined. Since the downward movement of ling 38 is prevented by its disposition within slot 42, counterclockwise rocking of arms 24 and 25 will be prevented, and the release mechanism will be locked against movement by the weight of the containers on conveyor 11.

Since the intermediate and rear portions 47 of the upper surfaces of cam slots 45 are inclined, these surface portions will engage pin 43 in such a manner as to create a rearward force component on link 38. The degree of this force component will of course depend on the friction angle between the materials of which pin 43 and links 24 and 25 are composed. However, with standard materials such as steel it will be found that the weight of containers on conveyor 11, which urges arms 24 and 25 in a counterclockwise direction, will aid in the further rearward movement of pin 43 when portions 47 of slots 45 engage this pin.

The length of slots 45 is substantially greater than that of slot 39, and is such that when pin 43 has been moved to the rear of slots 45, rocker assembly 23 will be swung counterclockwise into the dot-dash position of Figure 1. When in this position, the entire rocker assembly, including the top of stop plate 26 and rollers 28, are below the level of the bottoms of the containers on conveyor 11. When pin 43 is in its forward position and is disposed within the forward ends of slots 45, rocker assembly 23 is held in the solid line position of Figure 1 with a substantial portion of stop plate 26 in the path of the containers.

The means for returning rocker assembly 23 to its retaining position comprises solenoid spring 34 and tension springs 31 and 32 which are connected between mounting plate 17 and link 38. In particular, one end 48 of each of springs 31 and 32 is secured to a portion of bracket 21 just below mounting plate 17, and the opposite ends 49 of these springs are connected to a bracket 51 on an intermediate portion of link 38. Springs 31 and 32 urge link 38 to the left in Figures 1 and 2, thus tending to lift rocker assembly 23 into its retaining position with pin 43 in the forward end of slots 45.

In the operation of the mechanism so far described, stop assembly 23 will normally be in the solid line position of Figure 1 with the weight of the containers on conveyor 11 pressing against plate 26. Although this weight will urge assembly 23 counterclockwise about pivot 22, the locking portion 46 of cam slots 45 will prevent this movement because of its engagement with pin 43. When it is desired to release the forward container 13, solenoid 29 will be momentarily actuated by any appropriate control system. This will cause pin 41 to move rapidly rearwardly until it hits the rear end of slot 39. This impact will cause pin 43 to become dislodged from locking surfaces 46 of slots 45. Armature 33 will continue to move to the right, pulling pin 43 toward the rear ends of slots 45. After pin 43 has left the forward ends of slots 45, this movement will be aided by the weight of the containers on conveyor 11 because of the camming action of surfaces 47 of slots 45 on pin 43. Since pin 43 is restrained to linear movement, rocker assembly 23 will be swung counterclockwise into its releasing position shown in dot-dash lines in Figure 1. Container 13 will then move past the end of conveyor 11 in such a manner as to create a space between it and the next container 14 as more fully described below.

After the momentary energization of solenoid 29 is terminated armature 33 will be urged to the left by spring 34. Pin 41 will engage the left-hand end of slot 39, thus urging link 38 to the left. This movement will be aided by springs 31 and 32, and pin 43 will again move to the forward end of slots 45. This will cam rocker assembly 23 clockwise so that stop plate 26 moves into obstructing relation with the next container 14, this container still advancing toward the stop plate. When container 14 hits stop plate 26, the tendency of rocker assembly 23 to move counterclockwise will again be resisted by locking cam surfaces 46. Should it be desired to discharge more than one container, energization of solenoid 29 may be continued until the desired number of containers has been released, or the solenoid may be intermittently energized so that one container at a time is discharged.

Rollers 28 are engageable with the underside of the discharged container 13 should rocker assembly 23 be raised before this container has been completely removed from its path. In other words, upon lifting of rocker assembly 23 when only a portion of container 13 has moved past stop plate 26, rollers 28 will permit the continued discharging movement of container 13 even though the stop plate is in its retaining position.

Figures 4–15 illustrate three different arrangements of the release mechanism with various conveyors, it being understood that other arrangements than those illustrated could be utilized within the principles of the invention. Figures 4–7 show an arrangement in which an inclined conveyor 52 of the skate roll type has a release mechanism 53 positioned to engage the lower portions of the containers on the conveyor. A discharge conveyor 54 is positioned adjacent the end of conveyor 52 and may be a sliding or skate roll type. Conveyor 54 has a greater inclination than conveyor 52 and is provided with a roller 55 at its upper end, this roller being of such height as to be engageable by each container as it is discharged. When the release mechanism is in its retaining position as shown in Figure 4, stop plate 56 will be engaged by the lower portion of container 57, with containers 58, 59, etc. behind container 57. Upon movement of release mechanism 53 to its releasing position, as shown in Figure 5, the containers will roll down conveyor 52, with the first container 57 engaging roller 55 of discharge conveyor 54. The initial movement of containers 57, 58 and 59 will be in unison, but after the center of gravity of container 57 has passed roller 55, it will tip downwardly as shown in Figure 6 and will move at a faster rate than the succeeding containers. This tipping and increased motion will create a space in the vicinity of release mechanism 53, so that when this release mechanism is raised as shown in Figure 6, stop plate 56 will move into its retaining position without interference from the containers. This movement will of course take place before container 58 has reached stop plate 56. When container 58 engages the stop plate, its progress will be halted. It will therefore be seen that the improved conveyor release mechanism will cooperate with this conveyor arrangement to provide a positive and efficient method of discharging individual containers at will.

Should the stop assembly engage the underside of container 57 when it is raised, its roller 60 will permit continued movement and subsequent tipping of container 57 without any drag being created which might prevent creation of a space between containers 57 and 58. This condition is especially desirable where relatively light containers are being handled or when there are only a few containers on the conveyor, since under such conditions there might not be sufficient weight to maintain the desired speed of movement should frictional resistance be encountered.

Figures 8–11 show a modified arrangement in which the release mechanism is mounted above the conveyor so as to be engageable with the upper portions of the containers. Such an arrangement may be desired in certain instances, for example, when handling containers of substantial height. In such cases the sudden impact of the lower portion of a container with the stop plate could possibly result in the container tipping over forwardly and toppling past the release mechanism. If however a container moving down the conveyor hits the stop plate at its upper portion, the tendency would be for the container to be forced even more firmly against the conveyor, thus preventing the above-described tipping action. In Figures 8–11 a conveyor 61 has a release mechanism 62 mounted thereabove a sufficient distance to accommodate containers 63, 64 and 65. A discharge conveyor 66 may be provided adjacent the end of conveyor 61, this discharge conveyor having a greater inclination than conveyor 61 and being provided with an end roller 67. When release mechanism 62 is in its retaining position as shown in Figure 8, the upper portion of container 63 will be engageable with stop plate 68. Upon movement of release mechanism 62 to its releasing position as shown in Figure 9, container 63 will move past the stop plate and, when its center of gravity has passed roller 67 as shown in Figure 10, it will tip over and move at a faster rate than before. Upon movement of release mechanism 62 to its retaining position as shown in Figure 10, stop plate 68 will be moved into the space created between containers 63 and 64. The latter container will hit stop plate 68 and be halted thereby, the impact having no tendency to dislodge container 64 from conveyor 61 because of the fact that the upper portion of container 64 has been engaged.

Figures 12–15 illustrate still another arrangement in which conveyor 69 is a slide conveyor and discharge conveyor 71 in a stake roll conveyor and is horizontal. Conveyor 69 is provided with slides 72 upon which containers 73, 74 and 75 move downwardly due to their weight. Stop plate 76 of release mechanism 77 is disposed between conveyors 69 and 71, this plate being positionable in the path of the lower portions of the containers as they advance on conveyor 69. When in its retaining position as shown in Figure 12, stop plate 76 will prevent movement of the containers on conveyor 69, but when moved to its releasing position shown in Figure 13, container 73 will slide downwardly onto skate rolls 78 of conveyor 71. As container 73 changes its inclination, a space 79 will be created between this container and container 74. The increased speed of container 73 as it passes from the slide conveyor to the skate roll conveyor will create a further gap between it and its succeeding container. Thus, when stop plate 76 is returned to its retaining position shown in Figure 14, it will not be interfered with by container 73, and will move into the path of the lower portion of container 74. When the latter container hits plate 76 as shown in Figure 15, its progress will be halted.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

In a release mechanism for use in conjunction with an inclined chute carrying merchandise packages, an elongated member pivotally mounted below said chute on a transverse axis spaced rearwardly from the lower end thereof, a releasing gate carried by the lower end of said elongated member and extending upwardly therefrom, the elongated member being movable between a retaining position in which said gate is in obstructing relation with packages on said chute and a releasing position in which said gate is retracted below said chute, a second member slidably mounted below said chute and adjacent said first elongated member, said second member being movable in a direction parallel to said chute between a retaining position and a releasing position, resilient means urging said second member to its retaining position, a solenoid for moving said second member from its retaining position to its releasing position, a pin on one of said members having an axis parallel to said first axis, and a slot on the other of said members and receiving said pin, the pin being at one end of said slot when the parts are in their retaining position and at the other end of said slot when the parts are in their releasing position, the slot being of continuously curved shape in one direction substantially throughout its extent, said first end of the slot being substantially parallel to the extent of said chute for a distance at least equal to the pin diameter, the portion of the slot adjacent said first end being relatively slightly inclined with respect to the chute whereby a relatively high leverage will be exerted by said pin on said other member during the first portion of pin movement toward its releasing position, said other end of the slot being substantially inclined with respect to said first end.

References Cited in the file of this patent

UNITED STATES PATENTS

| | | |
|---|---|---|
| 1,418,573 | Hoyt et al. | June 6, 1922 |
| 1,462,283 | Hegnes | July 17, 1923 |
| 1,773,885 | Staley | Aug. 26, 1930 |
| 1,854,446 | Campbell | Apr. 19, 1932 |
| 2,071,771 | Shield | Feb. 23, 1937 |
| 2,074,351 | Zeigler | Mar. 23, 1937 |
| 2,661,682 | Saunders | Dec. 8, 1953 |
| 2,738,103 | Bisese | Mar. 13, 1956 |

FOREIGN PATENTS

| | | |
|---|---|---|
| 676,715 | Germany | June 9, 1939 |